United States Patent
Kia et al.

(10) Patent No.: US 9,273,401 B2
(45) Date of Patent: Mar. 1, 2016

(54) GALVANIC CORROSION MITIGATION WITH METALLIC POLYMER MATRIX PASTE

(71) Applicant: GM Global Technology Operations LLC, Detroit, MI (US)

(72) Inventors: Hamid G. Kia, Bloomfield Hills, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/973,437

(22) Filed: Aug. 22, 2013

(65) Prior Publication Data

US 2015/0053573 A1   Feb. 26, 2015

(51) Int. Cl.
*C23F 13/00* (2006.01)
*C23F 13/12* (2006.01)

(52) U.S. Cl.
CPC .............. *C23F 13/12* (2013.01); *C23F 13/005* (2013.01); *C23F 2213/30* (2013.01)

(58) Field of Classification Search
CPC .......... C23F 13/08; C23F 13/10; C23F 13/12; C23F 13/14; C23F 13/16; C23F 13/18; C23F 13/06; C23F 2213/30; B60R 99/00; B23B 5/16; C23C 18/1662; C09J 5/00; C09J 5/02; C09J 5/04; C09J 5/06; C09J 5/08; C09J 5/10; B62D 29/001; B62D 29/005
USPC ................. 204/196.01, 196.37; 205/724, 740
See application file for complete search history.

(56) References Cited

U.S. PATENT DOCUMENTS

| 6,468,613 B1 | 10/2002 | Kitano et al. |
| 6,582,172 B2 | 6/2003 | Nickerson et al. |
| 6,749,254 B1 | 6/2004 | Kleven et al. |
| 7,387,277 B2 | 6/2008 | Kordel et al. |

(Continued)

FOREIGN PATENT DOCUMENTS

WO    2007091990 A2    8/2007

OTHER PUBLICATIONS

Chen, Yong Jun, et al., "Controlled growth of zinc nanowires," Materials Letters, vol. 61, pp. 144-147 (2007) (published online May 6, 2006).

(Continued)

*Primary Examiner* — Luan Van
*Assistant Examiner* — Alexander W Keeling
(74) *Attorney, Agent, or Firm* — Harness, Dickey & Pierce, P.L.C.

(57) ABSTRACT

A method of mitigating galvanic corrosion on a vehicle is provided for use of metals with carbon containing composites. An electrically conductive material comprising a plurality of electrically conductive metallic particles and a polymer is applied to a corrosion susceptible region of an assembly having a carbon-reinforced composite and a metal. The electrically conductive material has an electrical conductivity of greater than or equal to about $1 \times 10^{-4}$ S/m and serves as a sacrificial anode to mitigate or prevent corrosion of the metal in the assembly. Also provided are assemblies for a vehicle having reduced galvanic corrosion that include a metal component in contact with a carbon-reinforced composite, which defines a corrosion susceptible region having an electrically conductive material disposed therein.

10 Claims, 4 Drawing Sheets

(56) References Cited

U.S. PATENT DOCUMENTS

| | | | |
|---|---|---|---|
| 7,795,878 | B2 | 9/2010 | Purdy et al. |
| 7,981,501 | B2 | 7/2011 | Kwag et al. |
| 8,043,543 | B2 | 10/2011 | Wang et al. |
| 8,101,036 | B2 * | 1/2012 | Schroeder et al. ........... 156/73.1 |
| 2007/0230196 | A1 | 10/2007 | Wang et al. |
| 2008/0265217 | A1 * | 10/2008 | Horton .......................... 252/503 |
| 2011/0080024 | A1 * | 4/2011 | Mihai ...................... 296/216.09 |
| 2012/0061710 | A1 * | 3/2012 | Toscano et al. ................. 257/99 |
| 2012/0119022 | A1 | 5/2012 | Purdy et al. |
| 2013/0089733 | A1 | 4/2013 | Raghavan et al. |
| 2015/0001768 | A1 | 1/2015 | Kia et al. |

OTHER PUBLICATIONS

Eager Polymers, "Clear Polyster Casting Resin," <http://www.eagerplastics.com/4101.htm> (2 pages) (downloaded on Aug. 14, 2013).

Eager Polymers, "Two-component Casting Urethanes—Rigid and Flexible," <http://www.eagerplastics.com/cast.htm> (2 pages) (downloaded on Aug. 14, 2013).

Eager Polymers, "Two-component Epoxy Systems—Filled or Unfilled," <http://www.eagerplastics.com/epoxy.htm> (1 page) (downloaded on Aug. 13, 2013).

Garboczi, E. J., et al., "Geometrical percolation threshold of overlapping ellipsoids," Physical Review E, vol. 52, No. 1, pp. 819-828 (Jul. 1995).

Green Steel Group, "Zinc Fiber—SOZ1 dimensions," <http://www.greensteelgroup.com/pdf/zinc/zinc-fibers-dimensions.pdf> (1 page).

Helmenstine, Anne Marie, "Table of Electrical Resistivity and Conductivity: Flow of Electric Current Through Materials," About.com, <http://chemistry.about.com/od/moleculescompounds/a/Table-Of-Electrical-Resistivity-And-Conductivity.htm> (2 pages) (downloaded on Aug. 13, 2013).

Hu, Jianqiang, et al., "A shortcut hydrothermal strategy for the synthesis of zinc nanowires," J. Phys. D: Appl. Phys., vol. 41, No. 3, pp. 1-4 (Jan. 7, 2008).

Hwang, Sungwoo, et al., "Synthesized Aluminum Nanowires for Future Interconnects," IEEE Nanotechnology Magazine, Sep. 2012 Issue, pp. 24-26 (Aug. 21, 2012).

Mamunya, Ye P., et al., "Electrical and thermal conductivity of polymers filled with metal powders," European Polymer Journal, vol. 38, pp. 1887-1897 (2002).

Ota, T., et al., "Control of percolation curve by filler particle shape in Cu—SBR composites," Journal of Materials Science Letters, vol. 16, pp. 1182-1183 (1997).

Wang, Jin-Guo, et al., "Controllable Template Synthesis of Superconducting Zn Nanowires with Different Microstructures by Electrochemical Deposition," Nano Letters, vol. 5, No. 7, pp. 1247-1253 (2005) (published online Jun. 21, 2005).

* cited by examiner

GALVANIC CORROSION MITIGATION WITH METALLIC POLYMER MATRIX PASTE

FIELD

The present disclosure relates to corrosion protection for vehicle component assemblies that include metal and a carbon containing composite material, and more particularly to methods and devices having galvanic corrosion protection by using a metallic polymer matrix paste in such vehicle component assemblies having metal and carbon containing composite material.

BACKGROUND

This section provides background information related to the present disclosure which is not necessarily prior art.

Galvanic protection in vehicle components formed of dissimilar materials (e.g., different metal materials or metal/composite materials) can pose various challenges. In applications where the dissimilar materials are typically submerged or immersed in an electrolyte, galvanic protection need only be generally placed in electrical contact with the susceptible metal(s) and electrolyte. Thus, typical sacrificial anodes on an immersed vessel are not geometrically specific. For example, nautical ships, boats, and other vessels may have a single sacrificial anode attached to a submerged portion of the hull in contact with saltwater or fresh water, which serves to galvanically protect the entire ship. Thus, where the electrolyte is typically in continuous contact with the dissimilar materials, non-localized galvanic protection is possible.

However, galvanic protection in vehicles that are not submerged in an electrolyte, but rather may have dissimilar materials intermittently exposed to potential electrolytes pose particular challenges. Such vehicles may include automobiles, snowmobiles, motorcycles, and the like. Current approaches typically include corrosion protection by coating or otherwise insulating components from contact with one another. The general concept of such galvanic corrosion is to avoid creating an electrically conductive path between dissimilar materials when an electrolyte is present. For example, corrosion protection coatings may include electrically inert or insulating coatings, such as passivation layers and the like, or may involve physically separating the dissimilar materials. This is particularly true for applications that employ carbon-fiber composite materials near metal materials in metal vehicle components, such as metal structural members or frames.

Carbon containing materials, such as composite materials like carbon fiber reinforced plastics (CFRP) are generally considered to be galvanically incompatible with metal materials. Carbon serves as an efficient cathode and thus in the past, galvanic protection has focused on completely isolating the carbon containing material from nearby metals. However, use of coatings and other isolation techniques in dissimilar materials that employ carbon fiber composites can potentially still be vulnerable to galvanic corrosion over time, especially in non-marine environments where galvanic corrosion is intermittent and localized. For example, corrosion protection coatings applied to one or both of the dissimilar materials may have weakly adhered regions or minor manufacturing defects, such as fish eyes, pinholes, fissures, or cracks, which over long durations expose the underlying material and can concentrate corrosion therein. Furthermore, even if a corrosion protection coating has no weak or vulnerable regions whatsoever, fastening the dissimilar materials together (e.g., via mechanical fasteners, welding, or adhesives) disturbs the corrosion protection coatings and provides potential corrosion pathways.

Thus, additional techniques for galvanic protection of assemblies of components employing dissimilar materials, such as carbon containing composites and metals, would be highly desirable to improve reliability and reduce susceptibility to failure for such parts.

SUMMARY

This section provides a general summary of the disclosure, and is not a comprehensive disclosure of its full scope or all of its features.

In certain aspects, the present disclosure provides methods of mitigating galvanic corrosion on a vehicle. The method optionally comprises applying an electrically conductive material comprising a plurality of electrically conductive metallic particles and a polymer to at least one corrosion susceptible region of an assembly that comprises a carbon-reinforced composite material and a metal material. The at least one corrosion susceptible region is located adjacent to or near a terminal junction between the carbon-reinforced composite material and the metal material. The electrically conductive material has an electrical conductivity of greater than or equal to about $1\times10^{-4}$ S/m. Accordingly, the electrically conductive material serves as a sacrificial anode to mitigate or prevent corrosion of the metal material in the assembly.

In other aspects, the present disclosure provides a method of mitigating galvanic corrosion on a metal component for a vehicle. The method may comprise applying an electrically conductive material comprising a plurality of electrically conductive metallic particles and a polymer to at least one corrosion susceptible region on the metal vehicle component in contact with a carbon-reinforced composite. The at least one corrosion susceptible region is located adjacent to or near a terminal junction between the carbon-reinforced composite material and the metal vehicle component. The metal vehicle component may comprise a metal selected from the group consisting of: aluminum, iron, magnesium, alloys, and combinations thereof. The electrically conductive material has an electrical conductivity of greater than or equal to about $1\times10^{-4}$ S/m, and thus, serves as a sacrificial anode to mitigate or prevent corrosion of the metal vehicle component during a service life of the vehicle.

In yet another aspect, an assembly for a vehicle having reduced galvanic corrosion is provided. The assembly comprises a metal vehicle component in contact with a carbon-reinforced composite material. An electrically conductive material is disposed in at least one corrosion susceptible region located adjacent to or near a terminal junction between the carbon-reinforced composite material and the metal vehicle component. The electrically conductive material comprises electrically conductive metallic particles and a polymer. The electrically conductive material has an electrical conductivity of greater than or equal to about $1\times10^{-4}$ S/m to serve as a sacrificial anode to mitigate or prevent corrosion of the metal vehicle component of the assembly during a service life of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
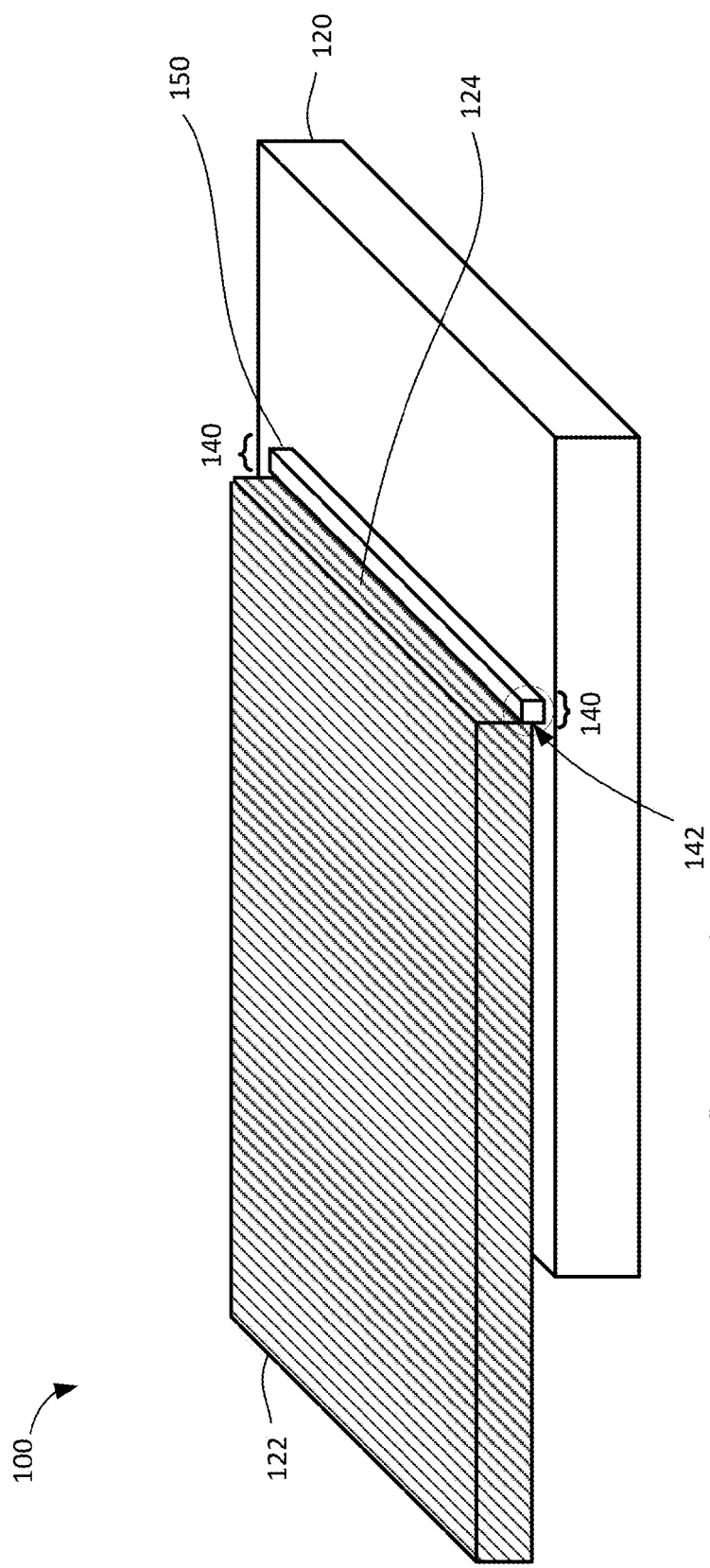
FIG. 2 shows an exemplary schematic of an assembly of dissimilar materials for a vehicle having an electrically conductive material disposed near a terminal junction between the dissimilar materials to provide corrosion protection in accordance with certain aspects of the present disclosure.
Figure 3:
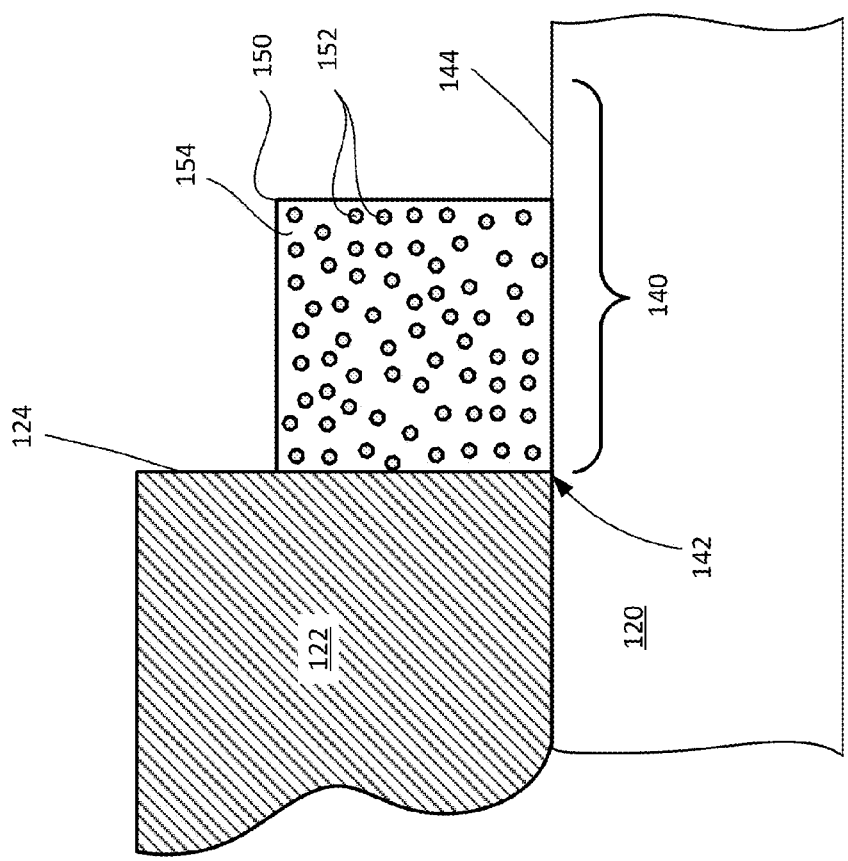
Figure 4:
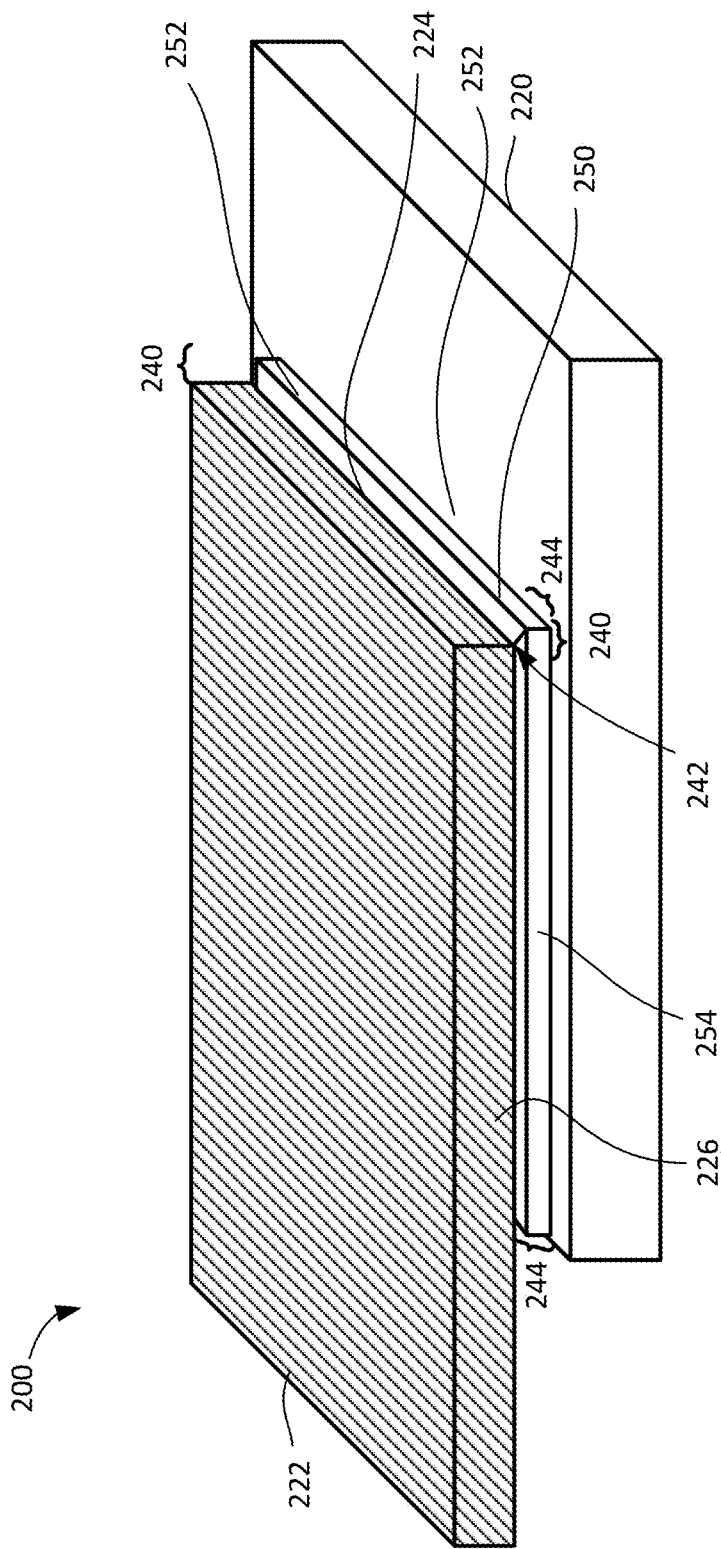

FIG. 3 is a detailed view of the terminal junction between the dissimilar materials having the electrically conductive material disposed therebetween in FIG. 2; and FIG. 4 shows another exemplary schematic of an assembly of dissimilar materials for a vehicle having an electrically conductive material disposed near a terminal junction between the dissimilar materials along two distinct terminal edges of the carbon containing material to provide corrosion protection in accordance with certain other aspects of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, and the like may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Automotive vehicle bodies may have complementary structural panels or members attached or fastened to one another or have a panel attached or fastened to a frame structure. Certain components, such as vehicle doors and other closure members, are often made of an assembly of inner and outer panels. The panels of the assembly can be made of similar materials, for example, stamped steel sheet or stamped aluminum sheets, which are then joined by welding, hemming, mechanical fasteners, or adhesive bonding. However, such stamped metal sheets are heavy and expensive. In a continuing effort to improve fuel efficiency and reduce weight of a range of automotive vehicles used worldwide, it is advantageous to form components of durable, lighter materials, such as reinforced composite materials like carbon reinforced plastics or other composite materials. For example, inner and outer door panels, lift gate panels, hoods and deck lids can be made of any combination of steel panels, aluminum panels, magnesium panels, carbon composite panels to satisfy structural, weight, and appearance requirements. Such dissimilar material assemblies may also be used to create structural subsystems or body frames that comprise panels and structural members of various shapes, including castings and extrusions, and the like.

However, as discussed above, use of dissimilar materials in component assemblies has often been avoided due to issues with galvanic corrosion, especially when using carbon containing composite materials with metals, such as ferrous alloys, like steel, aluminum alloys or magnesium alloys. A "carbon containing composite material" is meant to include a composite material comprising a polymeric matrix and particles comprising carbon (dispersed in the polymeric matrix for reinforcement), which can exhibit suitable mechanical properties, such as strength, stiffness, and toughness. Suitable carbon particles include carbon or graphite fibers, carbon black, graphene, and graphite, by way of non-limiting example. Suitable polymeric matrices include epoxy resins or polyesters, by way of non-limiting example, which will be discussed in more detail below.

Figure 1:
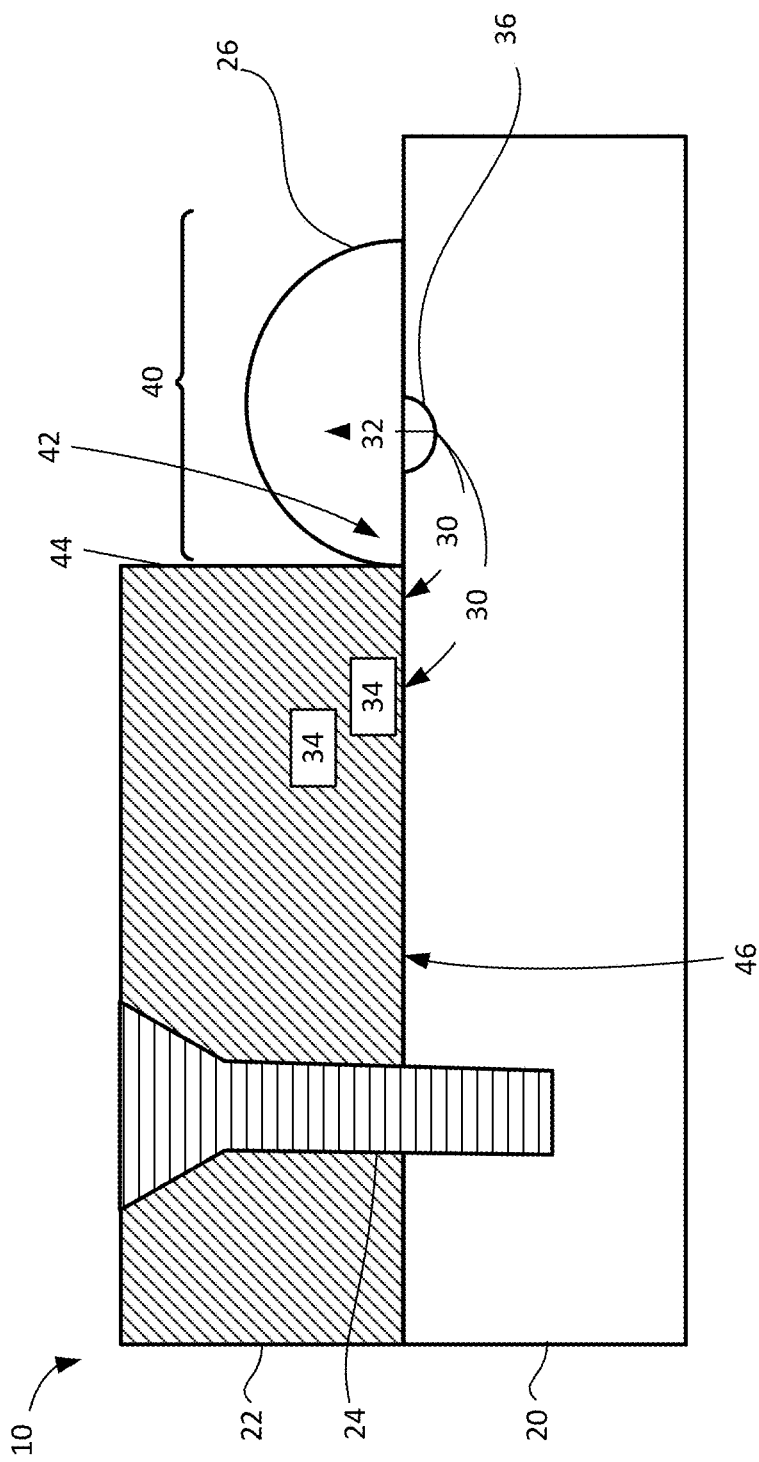
FIG. 1 shows an exemplary schematic of galvanic corrosion mechanism at a terminal junction between two dissimilar materials in the presence of an electrolyte.

In accordance with various aspects of the present disclosure, methods for preventing galvanic corrosion in assemblies comprising dissimilar materials are provided. By way of background, FIG. 1 shows a typical mechanism for galvanic corrosion mechanism between two dissimilar materials used in an assembly 10 (e.g., for an automotive component). The assembly includes a metal panel 20 and a carbon containing composite material panel 22. In certain variations, the metal panel 20 may comprise a metal selected from the group consisting of: iron, aluminum, magnesium, alloys and combinations thereof. Thus, the metal panel 20 may be formed of a metal, such as steel or an aluminum alloy, by way of non-limiting example. The carbon containing composite material forming the carbon containing composite material panel 22 may comprise a polymeric matrix and carbon fibers as a reinforcement phase. The metal panel 20 and carbon containing composite material panel 22 may be mechanically fastened together (shown as an exemplary screw 24); however, the panels may also be coupled or adhered by other conventional joining techniques known to those of skill in the art, including other types of mechanical fasteners, welds, adhesives, and the like.

In applications like automotive vehicles, exposure to electrolytes like water may be localized and intermittent. As shown in FIG. 1, a droplet of electrolyte 26 (e.g., water) is present on the metal panel 20 adjacent to the composite material panel 22. The presence of the electrolyte 26 makes it possible for an electrically conductive path to be established between the metal panel 20 and the carbon containing composite material panel 22, thus forming a closed electrical circuit. In doing so, due to the differences in galvanic potential between the metal panel 20 and the carbon containing composite material panel 22 facilitate generation of electrons 30 and metal cations 32 by oxidative disassociation of the anodic metal material. The metal material in metal panel 20 has a relatively low standard electrode potential)($V°$ on the galvanic or electromotive force (emf) series as compared to the carbon containing composite material in panel 22. Thus, carbon containing composite material panel 22 serves as a cathode in such a galvanic couple (having positive cations 34), while metal panel 20 serves as an anode that generates electrons and is sacrificed during the corrosion process, as shown by corrosion pit 36.

Notably, FIG. 1 shows a terminal junction 42 (e.g., a terminal edge or boundary of the carbon containing composite material panel 22) where the carbon containing composite material panel 22 ends on the metal panel 20 and thus where corrosion typically occurs. Notably, the terminal junction 42 only occurs where the carbon containing composite material panel 22 ends (and there might be potential electrolyte exposure), but is not associated with every contact region defined between the metal panel 20 and a carbon containing composite material panel 22. Thus, a contact region 46 is formed between the panels 20, 22, but because no electrolyte exposure may occur in this contact region, corrosion would not initiate here.

Generally, a corrosion susceptible region or zone 40 between the metal panel 20 and a carbon containing composite material panel 22 is understood to be adjacent to or near the terminal junction 42 between the carbon-reinforced composite material panel 22 and the metal panel 20, which may come into contact with the electrolyte 26 to establish electrical communication and close an electrical circuit between the dissimilar materials (the carbon-reinforced composite material panel 22 and the metal panel 20). Depending on the geometry of the respective materials that are in proximity to one another, such a corrosion susceptible region 40 is typically less than or equal to about 10 mm from a terminal edge of the carbon containing composite material panel 22. In certain variations, the corrosion susceptible region 40 may be 0 mm from a terminal edge 44 of the carbon containing composite material panel 22 (e.g., directly adjacent and in contact with the carbon containing composite material panel 22) to less than or equal to about 5 mm from the terminal edge 44 of the carbon containing composite material panel 22.

In various aspects, the present disclosure provides methods for mitigating galvanic corrosion in an assembly that comprises dissimilar materials. In certain variations, such dissimilar materials may be a carbon-reinforced composite material and a metal material, such as a metal structural member for a vehicle, e.g., a panel. It should be noted that in certain aspects, the methods of mitigating galvanic corrosion and components formed therefrom are not limited to vehicle components, like panels for vehicles, but may be any type of assembled components for vehicles. Further, in certain variations, the present teachings may apply more broadly to any use of dissimilar materials in a component assembly and are not limited to only vehicle or automotive applications.

Accordingly, in certain aspects, the present disclosure contemplates minimizing or preventing galvanic corrosion in an assembly of dissimilar materials, such as a carbon-reinforced composite material and a metal material in near proximity or contact with one another. It should be noted that "minimizing" or "mitigating" are intended to mean that over longer durations of time, some minor corrosion may occur with use of such dissimilar materials, but it amounts to relatively minor corrosion damage that will not impede functioning or otherwise cause mechanical failure of the parts. However, in certain variations, the methods of the present disclosure serve to prevent galvanic corrosion altogether for a service life of a vehicle when such dissimilar materials are used in proximity to one another. A service life of a vehicle may be greater than or equal to about 3 years, optionally greater than or equal to about 5 years, optionally greater than or equal to about 7 years, optionally greater than or equal to about 8 years, optionally greater than or equal to about 9 years, optionally greater than or equal to about 10 years, and in certain variations, greater than or equal to about 15 years.

Thus, in certain aspects, the present disclosure provides a method of minimizing or preventing galvanic corrosion, which optionally comprises applying an electrically conductive material to at least one corrosion susceptible region of a surface of an assembly comprising dissimilar materials, such as a carbon-reinforced or carbon containing composite material and a metal material in near proximity or contact with one another. The electrically conductive material comprises a plurality of electrically conductive metallic particles and a polymeric matrix. In certain aspects, the electrically conductive material is in a paste, malleable, or flowable form, which may be applied via caulking to a surface corresponding to the corrosion susceptible region. In certain aspects, the applying of the electrically conductive material or paste is near or on top of all potential electrolyte contact areas in a corrosion susceptible region of the assembly. However, in certain preferred variations, the electrically conductive material is not applied between the two dissimilar material substrates outside of the corrosion susceptible regions, for example, as a layer or coating formed between the non-exposed regions of panels (see, e.g., contact region 46 of FIG. 1). Moreover, in certain variations, the electrically conductive material is applied so as to either abut or be adjacent to a terminal edge of the carbon fiber composite material or panel (e.g., within 0 to 10 mm). Additionally, it should be noted that in certain aspects of the present disclosure, the electrically conductive material is not intended to be used as a sealant, a coating, or an adhesive, but rather merely serves as a sacrificial anode for the assembly. Thus, in certain variations, the electrically conductive material has no mechanical or structural function aside from serving as a sacrificial anode or stated in another way, the electrically conductive material has a sole function of serving as a sacrificial anode.

To this end, in certain variations, the methods of the present disclosure fasten or couple a carbon-reinforced composite material (e.g., a carbon-composite component like a panel) to the metal vehicle component (e.g., a panel of a frame) to form an assembly. The fastening of the carbon containing composite material to the metal vehicle component thus occurs before the applying of the electrically conductive matrix to a corrosion susceptible region near a terminal junction between the two materials in the assembly. For example, structural adhesives can be used to join panels of metal alloys and composites. In other aspects, the metal vehicle component and carbon containing composite can be joined with mechanical fasteners, such as screws, bolts, clamps, welds, and the like.

The electrically conductive material may be applied to the substrate using known application methods, including caulking, extruding, painting, brushing, roller coating, doctor blade coating, spraying, and the like. The surfaces on which the electrically conductive material is applied may be cleaned before the application process. Such cleaning typically serves to remove any loosely adhered contaminants, such as oils, grease, waxy solids, particles (including metallic particles, carbon particles, dust, and dirt), silica, scale, and mixtures thereof. Pre-cleaning may include mechanical abrasion, cleaning with traditional alkaline cleaners, surfactants, mild acid washes, and/or ultrasonic cleaning.

The electrically conductive metallic particles of the material are selected to have a relatively low standard electrode potential)($V°$) on the galvanic or electromotive force (emf) series as compared to the metal material. In this regard, the plurality of electrically conductive metallic particles are thus chosen to serve as an anode and are chosen based on the metal material of the frame or other component in the assembly. As shown in Table 1 below, for any combination of materials, the comparatively lower number will behave as an anode and corrode preferentially. Thus, for a given metal or alloy used as the metal material in the assembly, a metallic particle having a relatively lower number may be selected for use as the metallic filler particles in the material. Especially preferred are those metallic candidates that have relatively high electrical conductivity and low resistivity.

TABLE 1

1. Magnesium
2. Mg alloy AZ-31B
3. Mg alloy HK-31A
4. Zinc (hot-dip, die cast, or plated)
5. Beryllium (hot pressed)
6. Al 7072 clad on 7075
7. Al 2014-T3
8. Al 1160-H14
9. Al 7079-T6
10. Cadmium (plated)
11. Uranium
12. Al 218 (die cast)
13. Al 5052-0
14. Al 5052-H12
15. Al 5456-0, H353
16. Al 5052-H32
17. Al 1100-0
18. Al 3003-H25
19. Al 6061-T6
20. Al A360 (die cast)
21. Al 7075-T6
22. Al 6061-0
23. Indium
24. Al 2014-0
25. Al 2024-T4
26. Al 5052-H16
27. Tin (plated)
28. Stainless steel 430 (active)
29. Lead
30. Steel 1010
31. Iron (cast)
32. Stainless steel 410 (active)
33. Copper (plated, cast, or wrought)
34. Nickel (plated)
35. Chromium (Plated)
36. Tantalum
37. AM350 (active)
38. Stainless steel 310 (active)
39. Stainless steel 301 (active)
40. Stainless steel 304 (active)
41. Stainless steel 430 (active)
42. Stainless steel 410 (active)
43. Stainless steel 17-7PH (active)
44. Tungsten
45. Niobium (columbium) 1% Zr
46. Brass, Yellow, 268
47. Uranium 8% Mo.
48. Brass, Naval, 464
49. Yellow Brass
50. Muntz Metal 280
51. Brass (plated)
52. Nickel-silver (18% Ni)
53. Stainless steel 316L (active)
54. Bronze 220
55. Copper 110
56. Red Brass
57. Stainless steel 347 (active)
58. Molybdenum, Commercial pure
59. Copper-nickel 715
60. Admiralty brass
61. Stainless steel 202 (active)
62. Bronze, Phosphor 534 (B-1)
63. Monel 400
64. Stainless steel 201 (active)
65. Carpenter 20 (active)
66. Stainless steel 321 (active)
67. Stainless steel 316 (active)
68. Stainless steel 309 (active)
69. Stainless steel 17-7PH (passive)

TABLE 1-continued

70. Silicone Bronze 655
71. Stainless steel 304 (passive)
72. Stainless steel 301 (passive)
73. Stainless steel 321 (passive)
74. Stainless steel 201 (passive)
75. Stainless steel 286 (passive)
76. Stainless steel 316L (passive)
77. AM355 (active)
78. Stainless steel 202 (passive)
79. Carpenter 20 (passive)
80. AM355 (passive)
81. A286 (passive)
82. Titanium 5Al, 2.5 Sn
83. Titanium 13V, 11Cr, 3Al (annealed)
84. Titanium 6Al, 4V
    (solution treated and aged)
85. Titanium 6Al, 4V (anneal)
86. Titanium 8Mn
87. Titanium 13V, 11Cr 3Al
    (solution heat treated and aged)
88. Titanium 75A
89. AM350 (passive)
90. Silver
91. Gold
92. Graphite The electrically conductive material having the plurality of electrically conductive particles is applied to the one or more corrosion susceptible regions of the surface located adjacent to or near a terminal junction between the carbon-reinforced composite material and the metal material. It is noted that the plurality of electrically conductive particles contemplates use of a single species of particles having a single composition, but may also contemplate a plurality of different species of particles having distinct compositions. As recognized by those of skill in the art, the conductivity level is necessarily dependent on the type of conductive particle employed. Some representative and non-limiting electrically conductive materials are provided in Table 2 with resistivity and conductivity levels at 20° C. Of course, conductivity and resistivity values may vary depending on the particle size and shape.

TABLE 2

| Material | Resistivity ($\rho$) ($\Omega \cdot m$) | Conductivity ($\sigma$) (S/m) |
| --- | --- | --- |
| Silver | $1.59 \times 10^{-8}$ | $6.30 \times 10^{7}$ |
| Copper | $1.68 \times 10^{-8}$ | $5.96 \times 10^{7}$ |
| Annealed copper | $1.72 \times 10^{-8}$ | $5.80 \times 10^{7}$ |
| Gold | $2.44 \times 10^{-8}$ | $4.10 \times 10^{7}$ |
| Aluminum | $2.82 \times 10^{-8}$ | $3.5 \times 10^{7}$ |
| Calcium | $3.36 \times 10^{-8}$ | $2.98 \times 10^{7}$ |
| Magnesium | $4.3 \times 10^{-8}$ | $2.24 \times 10^{7}$ |
| Tungsten | $5.60 \times 10^{-8}$ | $1.79 \times 10^{7}$ |
| Zinc | $5.90 \times 10^{-8}$ | $1.69 \times 10^{7}$ |
| Nickel | $6.99 \times 10^{-8}$ | $1.43 \times 10^{7}$ |
| Lithium | $9.28 \times 10^{-8}$ | $1.08 \times 10^{7}$ |
| Iron | $1.0 \times 10^{-7}$ | $1.00 \times 10^{7}$ |
| Platinum | $1.06 \times 10^{-7}$ | $9.43 \times 10^{6}$ |
| Tin | $1.09 \times 10^{-7}$ | $9.17 \times 10^{6}$ |
| Carbon steel | $(10^{10})$ | $1.43 \times 10^{-7}$ |
| Lead | $2.2 \times 10^{-7}$ | $4.55 \times 10^{6}$ |
| Titanium | $4.20 \times 10^{-7}$ | $2.38 \times 10^{6}$ |
| Grain oriented electrical steel | $4.60 \times 10^{-7}$ | $2.17 \times 10^{6}$ |
| Manganin | $4.82 \times 10^{-7}$ | $2.07 \times 10^{6}$ |
| Constantan | $4.9 \times 10^{-7}$ | $2.04 \times 10^{6}$ |
| Stainless steel | $6.9 \times 10^{-7}$ | $1.45 \times 10^{6}$ |
| Mercury | $9.8 \times 10^{-7}$ | $1.02 \times 10^{6}$ |
| Nichrome | $1.10 \times 10^{-6}$ | $9.09 \times 10^{5}$ |
| Manganese | $1.44 \times 10^{-6}$ | $5 \times 10^{5}$ |
| GaAs | $5 \times 10^{-7}$ to $10 \times 10^{-3}$ | $5 \times 10^{-8}$ to $10^{3}$ |

In certain aspects, the electrically conductive material has an electrical conductivity of greater than or equal to about $1 \times 10^{-4}$ S/m and thus forms a sacrificial anode to mitigate or prevent corrosion of the metal material, e.g., metal structural member, of the assembly. In certain other variations, the electrically conductive material may have an electrical conductivity of greater than or equal to about $5 \times 10^{-4}$ S/m; optionally greater than or equal to about $1 \times 10^{-3}$ S/m; optionally greater than or equal to about $5 \times 10^{-3}$ S/m; and in certain variations, optionally greater than or equal $1 \times 10^{-2}$ S/m.

In certain aspects, the metal material may comprise aluminum (e.g., an aluminum alloy) and the plurality of electrically conductive metallic particles in the electrically conductive matrix is selected to comprise at least one metal selected from the group consisting of: zinc, magnesium, alloys, and combinations thereof. In other variations, the metal material comprises iron (e.g., a ferrous alloy like steel), and the plurality of electrically conductive metallic particles in the electrically conductive matrix comprises at least one metal selected from the group consisting of: zinc, aluminum, magnesium, alloys, and combinations thereof.

In certain aspects, the electrically conductive material comprises a polymer or polymer precursor selected from the group consisting of: epoxy resins, polyester resins, acrylate and methacrylate resins, polyurethanes, polyvinyl chloride (PVC)-based resins, butyl rubber, and combinations thereof. In certain variations, the polymer precursor is adhesive epoxy resin. Certain polymer precursors may be mixed with the electrically conductive filler particles and applied to the corrosion susceptible region of the surface in an uncured form. Thus, after applying the electrically conductive material, it may be cured by exposure to actinic radiation (e.g., ultraviolet radiation), heat, or chemical curing agents, or in some cases, such as with polyvinyl chloride, the material will solidify through the evaporation of a solvent, or in other cases through self condensation of the polymeric components.

An exemplary galvanic protection system in accordance with certain aspects of the present disclosure is shown in FIG. 2. An assembly 100 includes a metal vehicle component, such as a metal panel 120 and a carbon containing composite material, such as a carbon containing composite material panel 122. It will be appreciated that the concepts of the present teachings are applicable to a variety of components for a vehicle that employ dissimilar materials, including carbon containing composite and a metal and are not limited to panels of an illustrative frame assembly. The carbon containing composite material panel 122 is disposed over the metal panel 120. As best seen in FIG. 3, a terminal junction 142 is formed at a terminal edge 124 of the carbon containing composite material panel 122, where the carbon containing composite material panel 122 ends and there might be potential electrolyte exposure. Thus, a corrosion susceptible zone or region 140 is defined adjacent to or near the terminal junction 142 of the carbon-reinforced composite material panel 122 and the metal panel 120. As discussed above, in certain variations, the corrosion susceptible region 140 may be less than or equal to about 10 mm from the terminal edge 124 of the carbon containing composite material panel 122.

An electrically conductive material 150 is thus applied onto a surface 144 of the metal panel 120 within the corrosion susceptible region 140. Notably the electrically conductive material 150 is applied in contact with and abutting the terminal edge 124 of the carbon containing composite material panel 122, but may be disposed anywhere within the corrosion susceptible region 140 (e.g., less than or equal to about 10 mm from the terminal edge 124). Furthermore, while an exemplary cross-sectional shape is shown to be rectangular, it is contemplated that a bead of any cross-sectional shape may be used, including round or triangular shapes. The electrically conductive material 150 comprises a plurality of electrically conductive filler particles 152, which are dispersed within a polymeric matrix 154. "Matrix" refers generally to a polymer system having conductive filler particles distributed throughout within a polymer resin. The electrically conductive filler particles 152 are any of those described above and provide not only a sacrificial anode as compared to the metal in the metal panel 120, but also provide the electrically conductive material 150 with the necessary level of electrical conductivity.

In certain variations, the electrically conductive material 150 includes electrically conductive filler particles 152 distributed homogeneously (i.e., evenly) throughout the polymeric matrix 154. By "homogeneous," it is meant that the particles are substantially evenly distributed throughout the polymeric matrix 154, such that any potential detrimental effects resulting from uneven and/or localized charge distribution are minimized.

In certain embodiments, the electrically conductive filler particles 152 may have an axial geometry or a round geometry. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry conductive particles suitable for use in the electrically conductive material 150 of present disclosure may have high aspect ratios, ranging from about 10 to about 5,000, for example. In certain variations, the electrically conductive filler particle 152 having an axial-geometry include fibers, wires, whiskers, filaments, tubes, rods, and the like. By way of example, certain suitable axial-geometry particles may include zinc nanowires or aluminum nanowires. "Round geometry" particles typically have lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. It should further be noted that prolate spheroids may have relatively large aspect ratios and form needle or other elongated shapes, by way of non-limiting example, prolate spheroids may have aspect ratios ranging 0.0005 to 500. Similarly, oblate spheroids may have disc shapes that likewise have relatively high aspect ratios. Thus, a generally round geometry particle is not limited to relatively low aspect ratios and spherical shapes. For generally round geometry electrically conductive filler particles, an average particle size diameter of the electrically conductive filler particle 152 may be greater than or equal to about 20 nm to less than or equal to about 1,000 μm, optionally greater than or equal to about 40 nm to less than or equal to about 600 μm, optionally greater than or equal to about 80 nm to less than or equal to about 300 μm, by way of non-limiting example. Furthermore, for axial-geometry electrically conductive filler particle 152, an average length may optionally be greater than or equal to about 100 nm to less than or equal to about 3,000 μm; optionally greater than or equal to about 500 nm to less than or equal to about 1,500 μm; optionally greater than or equal to about 1000 nm to less than or equal to about 300 μm, by way of non-limiting example.

In certain embodiments, the electrically conductive filler particle 152 thus comprises a sacrificial metal material that is lower on the galvanic series than the metal in the metal panel 120 of the assembly. Selection of the conductive metal particles is highly dependent on the metal material of the metal panel 120. As noted above, suitable examples of the electrically conductive filler particle 152 include zinc, aluminum, magnesium, alloys, and combinations thereof.

A total amount of the electrically conductive filler particle 152 in the electrically conductive material 150 is dependent on the individual characteristics of the particle selected as appreciated by those of skill in the art. In various aspects, the total amount of the electrically conductive filler particle 152 in the electrically conductive material 150 exceeds a percolation threshold, or a concentration of conductive particles at which point the particles form a connected network for electrical conductivity within the electrically conductive material 150. Such a percolation threshold may be determined empirically the determining a critical loading point for the electrically conductive filler particle 152 above which a demonstrable change is observed in conductivity and/or resistance. As noted above, in certain variations, the total amount of electrically conductive filler particles 152 in the electrically conductive material 150 establishes an electrical conductivity of greater than or equal to about $1 \times 10^{-4}$ S/m, so as to form a sacrificial anode to mitigate or prevent corrosion of the metal material in an assembly. Furthermore, the total amount of the electrically conductive filler particle 152 also takes into account a tendency to disperse within the polymeric matrix 154. A concentration of electrically conductive filler particles 152 in the electrically conductive material 150 correlating to a percolation threshold varies with particle size, particle resistivity or conductivity, and geometry or particle shape, as recognized by those of skill in the art.

In certain non-limiting examples, a desired amount of the electrically conductive filler particle 152 that can provide an electrical conductivity of greater than or equal to about $1 \times 10^{-4}$ S/m can range from greater than or equal to about 4 to less than or equal to about 75 percent by volume of the total volume of the electrically conductive material 150; optionally greater than or equal to about 5 to less than or equal to about 60 percent by volume; optionally greater than or equal to about 8 to less than or equal to about 60 percent by volume; optionally greater than or equal to about 10 to less than or equal to about 50 percent by volume, by way of non-limiting example. In certain non-limiting embodiments, where the electrically conductive filler particle 152 comprises aluminum particles, such particles may be present at greater than or equal to about 10 to less than or equal to about 750 parts per hundred resin (phr).

An electrically conductive material 150 may be formed by admixing the plurality of electrically conductive filler particles 152 into the polymer resin (where there is more than a single conductive filler particle, the conductive particles may be pre-mixed together). In certain aspects, the plurality of the electrically conductive filler particles 152 is well mixed into the polymeric matrix 154 for even distribution and therefore even electrical conductivity. The mixture of polymeric matrix 154 and the electrically conductive filler particle 152 can be blended or mixed by equipment known in the art, such as for example, mixers, kneaders, extruders, and the like. The handling and flowability of a mixture of mixture of polymeric matrix 154 and the electrically conductive filler particle 152 is dependent on the viscosity of the polymer or polymer precursor selected, as well as a rate of crosslinking (e.g., once a catalyst is added that affects the viscosity of the mixture).

In certain variations, prior to adding the electrically conductive filler particle 152 an unfilled polymer matrix 154 may have a viscosity of greater than or equal to about 75 to less than or equal to about 4,000 cP, optionally greater than or equal to about 200 to less than or equal to about 3,000 cP; optionally greater than or equal to about 350 to less than or equal to about 2,000 cP; optionally to about 500 to less than or equal to about 1,000 cP at room temperature (e.g., about 21° C. or about 70° F.). In certain variations, the polymeric matrix 154 comprises an unfilled adhesive epoxy precursor that has such a viscosity of greater than or equal to about 500 to less than or equal to about 1,000 cP at room temperature, which readily enables addition and mixing of the electrically conductive filler particles 152.

FIG. 4 shows another embodiment of a galvanic protection system for an assembly for use in a vehicle in accordance with certain aspects of the present disclosure. An assembly 200 includes a metal vehicle component, such as a metal panel 220 and a carbon containing composite material, such as a carbon containing composite material panel 222. It will be appreciated that as discussed above the concepts of the present teachings are applicable to a variety of components for a vehicle that employ dissimilar materials, including and carbon containing composite and a metal and are not limited to panels of an illustrative frame assembly. Furthermore, the various embodiments and features previously described will not be repeated herein for brevity, but should be understood to apply equally to embodiments discussed herein. The carbon containing composite material panel 222 is disposed over the metal panel 220. A terminal junction 242 is formed at a first terminal edge 224 of the carbon containing composite material panel 122, where the carbon containing composite material panel 122 ends and meets the metal panel 220 and there might be potential electrolyte exposure. In addition, the terminal junction 242 is formed at a second terminal edge 226 of the carbon containing composite material panel 222, where the carbon containing composite material panel 222 ends and meets the metal panel 220 and there might be potential electrolyte exposure.

Thus, in FIG. 4, a first corrosion susceptible zone or region 240 is defined adjacent to or near the first terminal edge 224 of the carbon containing composite material panel 122 and the metal panel 220, while a second corrosion susceptible region 244 is formed adjacent to or near the second terminal edge 226 of the carbon-reinforced composite material panel 222 and the metal panel 220. As discussed above, in certain variations, the first or second corrosion susceptible regions 240, 244 may be less than or equal to about 10 mm from the respective first terminal edge 224 or second terminal edge 226 of the carbon containing composite material panel 222. While two terminal edges of the carbon containing composite material panel 222 are shown to create two corrosion susceptible regions, it should be noted that this is non-limiting configuration, as multiple edges and complex contours or shapes may occur at any terminal region where the carbon containing composite material panel 222 ends and the metal panel 220 begins (and exposure to electrolyte may occur).

An electrically conductive material 250 is thus applied onto a surface 252 of the metal panel 220 within both the first corrosion susceptible region 240 and the second corrosion susceptible region 244. The electrically conductive material 250 in the first corrosion susceptible region 240 is applied in contact with and abutting the first terminal edge 224 of the carbon containing composite material panel 222, while the electrically conductive material 250 in the second corrosion susceptible region 244 is applied in contact with and abutting the second terminal edge 226 of the carbon containing composite material panel 222. As with the previous embodiments, the electrically conductive material may be disposed anywhere within the first or second corrosion susceptible regions 240, 244 (e.g., less than or equal to about 10 mm from the first or second terminal edges 224, 226). Furthermore, as discussed above, while an exemplary cross-sectional shape here is rectangular, it is contemplated that a bead of any cross-sectional shape may be used, including round or triangular shapes. As with previous embodiments, the electrically conductive material 250 comprises a plurality of electrically conductive filler particles (not shown) dispersed within a polymeric matrix (not shown).

Thus in certain aspects, the present disclosure provides methods of mitigating galvanic corrosion on a vehicle. Specifically disclosed are methods that may comprise applying an electrically conductive material comprising a plurality of electrically conductive metallic particles and a polymer to at least one corrosion susceptible region of an assembly that comprises a carbon-reinforced composite material and a metal material. The at least one corrosion susceptible region may be located adjacent to or near a terminal junction defined between the carbon-reinforced composite material and the metal material. In certain variations, the electrically conductive material has an electrical conductivity of greater than or equal to about $1 \times 10^{-4}$ S/m. Thus, the electrically conductive material serves as a sacrificial anode to mitigate or prevent corrosion of the metal material of the assembly.

The method of the first embodiment optionally has any one or any combination of more than one of the following steps or features: (1) the applying of the electrically conductive material is to a surface of the metal material less than or equal to about 10 mm from a terminal edge of the carbon-reinforced composite material; (2) the applying of the electrically conductive material is to a surface of the metal material and the electrically conductive material contacts the carbon-reinforced composite material; (3) fastening the carbon-reinforced composite material to the metal material to form the assembly before the disposing of the electrically conductive material; (4) the electrically conductive material has a sole function of serving as a sacrificial anode; (5) the metal material comprises aluminum and the plurality of electrically conductive metallic particles in the electrically conductive material comprises a metal selected from the group consisting of: zinc, magnesium, alloys, and combinations thereof; (6) the metal material comprises steel and the plurality of electrically conductive metallic particles in the electrically conductive material comprises a metal selected from the group consisting of: zinc, aluminum, magnesium, alloys, and combinations thereof; and/or (7) the polymer in the electrically conductive material is a polymer or polymer precursor selected from the group consisting of: epoxy resins, acrylate resins, polyurethanes, poly vinyl chloride (PVC)-based resins, butyl rubber, and combinations thereof, wherein these features include all values and endpoints of numerical ranges and combinations thereof and all materials and combinations of materials disclosed above that may be included in steps mentioned for these features.

All possible combinations discussed and enumerated above as optional features of these methods are specifically disclosed as embodiments. Also specifically disclosed are combinations including this method optionally with any one or any combination of more than one of the enumerated features (1)-(7).

In yet other aspects, a method of mitigating galvanic corrosion on a metal vehicle component for a vehicle is specifically disclosed as a second embodiment that comprises applying an electrically conductive material comprising a plurality of electrically conductive metallic particles and a polymer to at least one corrosion susceptible region on the metal vehicle component in contact with a carbon-reinforced composite. The at least one corrosion susceptible region is located adjacent to or near a terminal junction between the carbon-reinforced composite material and the metal vehicle component. The metal vehicle component may comprise a metal selected from the group consisting of: aluminum, iron, magnesium, alloys, and combinations thereof. Further, the electrically conductive material has an electrical conductivity of greater than or equal to about $1 \times 10^{-4}$ S/m to serve as a sacrificial anode to mitigate or prevent corrosion of the metal vehicle component during a service life of the vehicle.

The method of the second embodiment optionally has any one or any combination of more than one of the following steps or features: (8) a method further comprising fastening the carbon-reinforced composite material to the metal vehicle component to form an assembly before the applying of the electrically conductive material; (9) the applying of the electrically conductive material is to a surface of the metal vehicle component less than or equal to about 10 mm from a terminal edge of the carbon-reinforced composite material; (10) the applying of the electrically conductive material is to a surface of the metal vehicle component and the electrically conductive material contacts the carbon-reinforced composite material; (11) the electrically conductive material has a sole function of serving as a sacrificial anode and does not mechanical attach the carbon-reinforced composite material to the metal vehicle component; (12) the metal material comprises aluminum and the plurality of electrically conductive metallic particles in the electrically conductive material comprises a metal selected from the group consisting of: zinc, magnesium, alloys and combinations thereof; (13) the metal material comprises steel and the plurality of electrically conductive metallic particles in the electrically conductive material comprises a metal selected from the group consisting of: zinc, aluminum, magnesium, alloys and combinations thereof; and/or (14) the polymer of the electrically conductive material is a polymer or polymer precursor selected from the group consisting of: epoxy resins, acrylate resins, polyurethanes, poly vinyl chloride (PVC)-based resins, butyl rubber, and combinations thereof.

All possible combinations discussed and enumerated above as optional features of these methods are specifically disclosed as embodiments. Also specifically disclosed are combinations including this method optionally with any one or any combination of more than one of the enumerated features (1)-(7) of the first embodiment or any of the enumerated features (8)-(14) of the second embodiment described just above.

In other embodiments, the disclosure provides a third embodiment. Such an embodiment may include an assembly for a vehicle having reduced galvanic corrosion, the assembly comprising a metal vehicle component in contact with a carbon-reinforced composite material having an electrically conductive material disposed in at least one corrosion susceptible region located adjacent to or near a terminal junction between the carbon-reinforced composite material and the metal vehicle component. The electrically conductive material comprises electrically conductive metallic particles and a polymer. The electrically conductive material has an electrical conductivity of greater than or equal to about $1 \times 10^{-4}$ S/m to serve as a sacrificial anode to mitigate or prevent corrosion of the metal vehicle component of the assembly during a service life of the vehicle.

Such a second embodiment of an assembly for a vehicle having improved galvanic corrosion properties optionally has any one or any combination of more than one of the following features: (15) the metal vehicle component is a metal panel for a frame comprises aluminum and the plurality of electrically conductive metallic particles in the electrically conductive material comprises a metal selected from the group consisting of: zinc, magnesium, alloys, and combinations thereof; (16) the metal vehicle component is a metal frame comprising steel and the plurality of electrically conductive metallic particles in the electrically conductive material comprises a metal selected from the group consisting of: zinc, aluminum, magnesium, alloys, and combinations thereof; (17) the polymer in the electrically conductive material is a polymer or polymer precursor selected from the group consisting of: epoxy resins, acrylate resins, polyurethanes, poly vinyl chloride (PVC)-based resins, butyl rubber, and combinations thereof; and/or (18) the electrically conductive material is disposed on a surface of the metal vehicle component less than or equal to about 10 mm from a terminal edge of the carbon-reinforced composite material.

All possible combinations discussed and enumerated above as optional features of these methods are specifically disclosed as embodiments. Also specifically disclosed are combinations including the assembly optionally with any one or any combination of more than one of the enumerated features (15)-(18) of the third embodiment, as well as any combination with enumerated features (1)-(14) of the first and second embodiments described above.

In various aspects, the inventive technology provides methods of mitigating galvanic corrosion caused by combining carbon-fiber composites with metals in vehicles. An electrically conductive material or paste is applied to a metal component nearby or in contact with a carbon composite material in regions that may be exposed to an electrolyte. The inventive technology thus enables mixed material usage without the drawback of galvanic corrosion, by integrating a sacrificial anodic element onto the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of mitigating galvanic corrosion on a vehicle, the method comprising:
   fastening a carbon-reinforced composite material and a metal material together to form an assembly, wherein after the fastening a terminal junction is formed between the carbon-reinforced composite material and the metal material; and
   applying an electrically conductive material comprising a plurality of electrically conductive metallic particles and a polymer to a surface of the metal material that corresponds to at least one corrosion susceptible region of the assembly that comprises the carbon-reinforced composite material and the metal material, wherein the electrically conductive material is applied at greater than 0 mm to less than or equal to about 10 mm from a terminal edge of the carbon-reinforced composite material so that the electrically conductive material does not contact the terminal edge of the carbon-reinforced composite material, and the electrically conductive material has an electrical conductivity of greater than or equal to about $1 \times 10^{-4}$ S/m to serve as a sacrificial anode to mitigate or prevent corrosion of the metal material of the assembly.

2. The method of claim 1, wherein the electrically conductive material has a sole function of serving as the sacrificial anode.

3. The method of claim 1, wherein the metal material comprises aluminum and the plurality of electrically conductive metallic particles in the electrically conductive material comprises a metal selected from the group consisting of: zinc, magnesium, alloys, and combinations thereof.

4. The method of claim 1, wherein the metal material comprises steel and the plurality of electrically conductive metallic particles in the electrically conductive material comprises a metal selected from the group consisting of: zinc, aluminum, magnesium, alloys, and combinations thereof.

5. The method of claim 1, wherein the polymer comprises a polymer or polymer precursor selected from the group consisting of: epoxy resins, acrylate resins, polyurethanes, poly vinyl chloride (PVC)-based resins, butyl rubber, and combinations thereof.

6. A method of mitigating galvanic corrosion on a metal vehicle component for a vehicle, the method comprising:
fastening a carbon-reinforced composite material and a metal vehicle component together to form an assembly, wherein after the fastening a terminal junction is formed between the carbon-reinforced composite material and the metal vehicle component; and
applying an electrically conductive material comprising a plurality of electrically conductive metallic particles and a polymer to a surface of the metal vehicle component that corresponds to at least one corrosion susceptible region on the metal vehicle component in contact with the carbon-reinforced composite material, wherein the electrically conductive material is applied at greater than 0 mm to less than or equal to about 10 mm from a terminal edge of the carbon-reinforced composite material so that the electrically conductive material does not contact the terminal edge of the carbon-reinforced composite material, the metal vehicle component comprises a metal selected from the group consisting of: aluminum, iron, magnesium, alloys, and combinations, and the electrically conductive material has an electrical conductivity of greater than or equal to about $1\times10^{-4}$ S/m to serve as a sacrificial anode to mitigate or prevent corrosion of the metal vehicle component during a service life of the vehicle.

7. The method of claim 6, where the electrically conductive material has a sole function of serving as the sacrificial anode.

8. The method of claim 6, wherein the metal vehicle component comprises aluminum and the plurality of electrically conductive metallic particles in the electrically conductive material comprises a metal selected from the group consisting of: zinc, magnesium, alloys, and combinations thereof.

9. The method of claim 6, wherein the metal vehicle component comprises steel and the plurality of electrically conductive metallic particles in the electrically conductive material comprises a metal selected from the group consisting of: zinc, aluminum, magnesium, alloys, and combinations thereof.

10. The method of claim 6, wherein the polymer comprises a polymer or polymer precursor selected from the group consisting of: epoxy resins, acrylate resins, polyurethanes, poly vinyl chloride (PVC)-based resins, butyl rubber, and combinations thereof.

* * * * *